US008131836B2

(12) United States Patent
Lyon

(10) Patent No.: US 8,131,836 B2
(45) Date of Patent: *Mar. 6, 2012

(54) MANAGING TCP ANYCAST REQUESTS

(75) Inventor: Barrett Gibson Lyon, Pacifica, CA (US)

(73) Assignee: BitGravity, Inc., Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/804,902

(22) Filed: Jul. 30, 2010

(65) Prior Publication Data

US 2011/0099259 A1    Apr. 28, 2011

Related U.S. Application Data

(63) Continuation of application No. 12/215,715, filed on Jun. 27, 2008, now Pat. No. 7,797,426.

(51) Int. Cl.
*G06F 15/173* (2006.01)
(52) U.S. Cl. .................... 709/223; 709/217; 709/226
(58) Field of Classification Search ............... 709/217, 709/223, 226, 246
See application file for complete search history.

(56) References Cited

U.S. PATENT DOCUMENTS

| | | | | |
|---|---|---|---|---|
| 7,574,499 | B1* | 8/2009 | Swildens et al. | 709/226 |
| 7,797,426 | B1* | 9/2010 | Lyon | 709/226 |
| 7,818,355 | B2 | 10/2010 | Mills et al. | |
| 2005/0010653 | A1* | 1/2005 | McCanne | 709/219 |
| 2007/0162945 | A1 | 7/2007 | Mills | |
| 2008/0091845 | A1 | 4/2008 | Mills et al. | |
| 2008/0235200 | A1 | 9/2008 | Washington et al. | |
| 2008/0235400 | A1* | 9/2008 | Slocombe et al. | 709/245 |
| 2009/0013414 | A1 | 1/2009 | Washington et al. | |
| 2009/0113057 | A1* | 4/2009 | Van der Merwe et al. | 709/227 |
| 2009/0292824 | A1* | 11/2009 | Marashi et al. | 709/247 |

OTHER PUBLICATIONS

Alzoubi et al, Anycast CDNs Revisited:, Apr. 2008, World Wide Web Conference Committee (IW3C2), pp. 277-286.*
Miura et al, "Server Load Balancing with Network Support: Active Anycast", 2000, IWAN 2000, pp. 371-384.*
Levine et al, "Operational Experience with TCP and Anycast", Jun. 2006, NANOG.Org.*
Al-Qudah et al, "Anycast Aware Transport for Content Delivery Networks", Apr. 2009, IW3C2.*
Wikipedia, "Content Delivery Network", http://en.wikipedia.org/wiki/Content delivery network [accessed May 4, 2010].*

* cited by examiner

*Primary Examiner* — Ramy M Osman
(74) *Attorney, Agent, or Firm* — Van Pelt, Yi & James LLP

(57) ABSTRACT

Managing TCP anycast requests at content delivery network nodes is disclosed. In some embodiments, managing traffic includes receiving a request at a first node of a content delivery network, determining at the first node that the request should be serviced by a second node of the content delivery network, and redirecting the request to the second node, wherein the first node and the second node of the content delivery network comprise endpoints for serving content and wherein the content delivery network is at least in part an anycast network.

43 Claims, 4 Drawing Sheets

MANAGING TCP ANYCAST REQUESTS

CROSS REFERENCE TO OTHER APPLICATIONS

This application is a continuation of U.S. patent application Ser. No. 12/215,715, issued as U.S. Pat. No. 7,797,426, entitled MANAGING TCP ANYCAST REQUESTS and filed Jun. 27, 2008, which is incorporated herein by reference for all purposes.

BACKGROUND OF THE INVENTION

A content delivery network (CDN) node typically includes a standard load balancer to delegate incoming requests to appropriate servers in one or more server farms associated with the CDN node. CDN nodes are typically distributed across many geographical areas to increase performance. To ensure that a request to a CDN node is sent to the correct CDN node, there is typically a management system in place which ensures delivery to the correct CDN node. There are many management systems that exist, including anycast, which is a state-less BGP based management system part of the standard TCP/IP v4 stack. However, when implementing an anycast management system, standard load balancers are typically not able to handle overload conditions which may occur, for example, if more traffic than the CDN node is capable of concurrently handling is routed to the CDN node. In such cases, at least some new requests may be denied service. Standard load balancers are also unable to detect anycast packets which have broken state during a network disruption, and as a result anycast networks may be incapable of ensuring TCP stability. Thus, there exists a need for improved techniques for managing requests routed to CDN nodes using an anycast system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
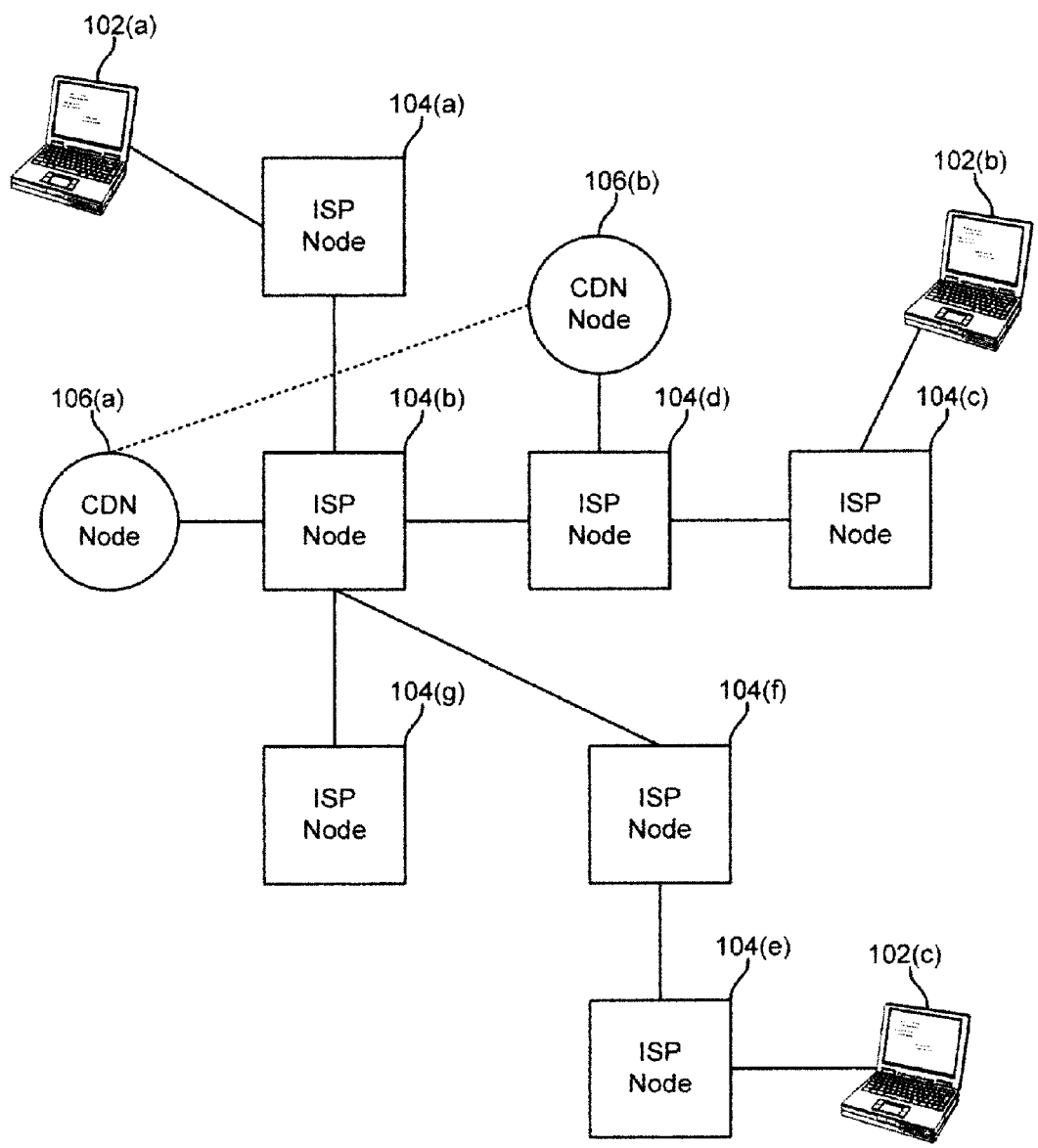
FIG. 1 is a block diagram illustrating an embodiment of at least a portion of the infrastructure of a network.

FIG. 1 is a block diagram illustrating an embodiment of at least a portion of the infrastructure of a network such as the Internet. A request for content from an end user 102 is routed by one or more ISP (Internet Service Provider) nodes 104 to an appropriate CDN node 106. The ISP nodes 104 may be associated with one or more providers. In some embodiments, each ISP node 104 comprises an autonomous system. The ISP nodes 104 and CDN nodes 106 are interconnected via a network such as the Internet. In the given example, such connections are depicted by solid lines. The CDN nodes 106 of a particular CDN provider are interconnected by a different network, e.g., also via the Internet, as depicted by the dashed line in the given example. In the example of FIG. 1, two nodes 106(a) and 106(b) of a CDN are depicted. In various embodiments, a CDN may comprise any number of nodes located in one or more geographical locations.

In order to efficiently service a request from an end user, an ISP often routes the request to the geographically closest CDN node. In some embodiments, a closest CDN node is determined by an ISP as the node that is the least number of autonomous system (AS) hops away from the end user. With respect to FIG. 1, for example, a request for content from end user 102(a) is routed by ISP nodes 104(a) and 104(b) to CDN node 106(a) instead of CDN node 106(b) because end user 102(a) is two AS hops away from CDN node 106(a) but three AS hops away from CDN node 106(b); a request for content from end user 102(b) is routed by ISP nodes 104(c) and 104(d) to CDN node 106(b) instead of CDN node 106(a) because end user 102(b) is two AS hops away from CDN node 106(b) but three AS hops away from CDN node 106(a); and a request for content from end user 102(c) is routed by ISP nodes 104(e), 104(f), and 104(b) to CDN node 106(a) instead of CDN node 106(b) because end user 102(c) is three AS hops away from CDN node 106(a) but four AS hops away from CDN node 106(b).

In some embodiments, each CDN node 106 comprises an endpoint (e.g., a server) for serving content rather than a backbone router of the CDN that routes requests to an appropriate and/or available endpoint within the CDN. In such cases, each of the CDN nodes 106 stores at least a portion of the corpus of content associated with the CDN. In some embodiments, the CDN comprises a distributed origin CDN in which each of at least a subset of nodes of the CDN stores the entire corpus of content associated with the CDN. In some embodiments, at least a subset of nodes of the CDN shares the same anycast IP address. In an anycast network, there is often a one-to-many association between network addresses and network endpoints, where each network address identifies a set of receiver endpoints, but only one of them is chosen at any given time to receive information from any given sender. Data is typically routed to the "best" destination. What is considered the best destination depends on system configuration. For example, in some embodiments, the best destination corresponds to the topologically closest destination; in some embodiments, the best destination corresponds to the geographically closest destination. In some embodiments, each CDN node may also be assigned a unique unicast IP address that may be internally employed for communication between nodes of the CDN. For example, CDN nodes 106(*a*) and 106(*b*) can appear to have the same anycast IP address to an end user, and the "best" node is selected to service the end user. To communicate amongst themselves, the CDN nodes may be assigned different unicast IP addresses.

In the cases in which the nodes of a CDN are endpoints for serving content, more traffic than a CDN node is able to service at a given time may be routed to the CDN node by one or more ISP nodes. For example, in the example of FIG. 1, consider that CDN node 106(*a*) is located in California, that CDN node 106(*b*) is located in Virginia, and that both CDN nodes are hosting live video content of an event happening in California. In such a case, a huge local user base may exist on the west coast while a much smaller user base may exist on the east coast. Requests for content from users are routed by one or more ISP nodes to the geographically closest CDN node. In the given example, requests from users on the west coast are routed to CDN node 106(*a*) while requests from users on the east coast are routed to CDN node 106(*b*). However, due to the large user base on the west coast, more requests may be routed to CDN node 106(*a*) than it can handle at a given time. Techniques for handling requests at a CDN node once it has reached its maximum capacity are disclosed for CDNs whose nodes comprise endpoints for serving content.

Figure 2:
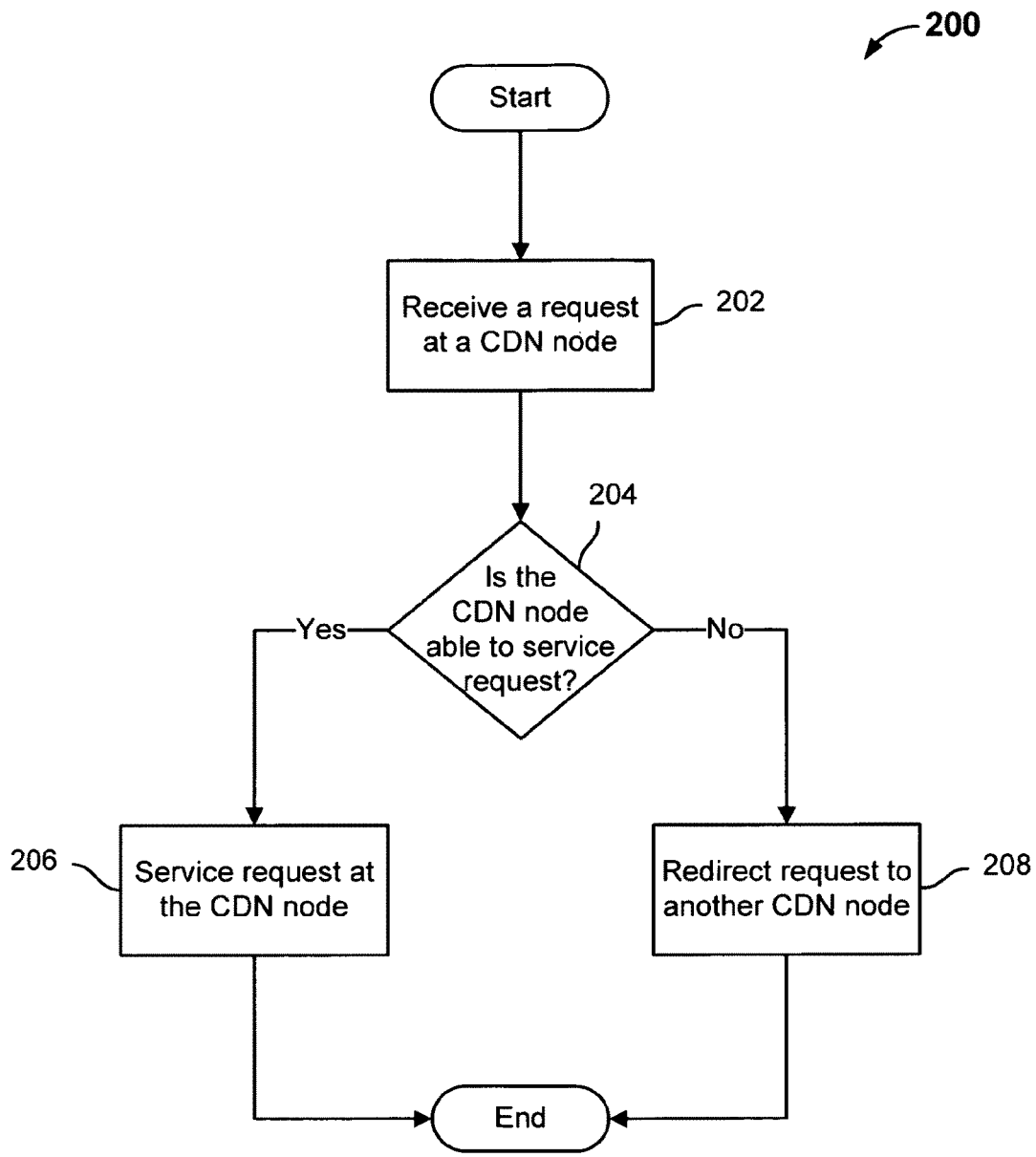
FIG. 2 illustrates an embodiment of a process for managing traffic at a CDN node.

FIG. 2 illustrates an embodiment of a process for managing traffic at a CDN node. For example, process 200 may be employed by CDN nodes 106(*a*) and 106(*b*) of FIG. 1, CDN node 300 of FIG. 3, and/or CDN node 400 of FIG. 4. Process 200 starts at 202 at which a request is received at a CDN node. For example, the request may be received at the CDN node from one or more ISP nodes because it is geographically the closest CDN node to the requesting end user. In various embodiments, the request of 202 may comprise a request to access or download content, a request to upload content, a request to modify (e.g., delete, update, rename, etc.) content, etc. In some embodiments, the request of 202 comprises a TCP anycast request. At 204 it is determined at the CDN node whether it has the capacity or bandwidth to service the request. In some embodiments, the determination of 204 is based at least in part on the number of sessions currently being serviced by the CDN node. For example, a CDN node may have the capacity to service a prescribed number of sessions at any given time. Different CDN nodes may have different capacities. In some embodiments, 204 includes determining at the CDN node whether it is currently servicing less than a prescribed threshold number of sessions. If it is determined at the CDN node at 204 that it is able to service the request, e.g., because it is currently servicing less than a prescribed threshold number of sessions, the request is serviced at the CDN node at 206; and process 200 subsequently ends. If it is determined at the CDN node at 204 that it is not able to service the request, e.g., because it is currently servicing a prescribed threshold number of sessions, the request is redirected to another CDN node at 208; and process 200 subsequently ends. In this case, the request is serviced by the other CDN node to which the request is redirected at 208 since the CDN node that receives the request at 202 does not have the resources or capacity to at least currently service any more requests. With respect to the example described above, for instance, at least some of the requests from the west coast users received at the CDN node in California may be redirected to the CDN node in Virginia if the CDN node in California is already servicing a prescribed threshold number of sessions. In some embodiments, selection of the other CDN node to which to redirect the request is based on the capacity of the other CDN node to service the request. For example, the other CDN node may be selected because it is currently servicing less than a prescribed threshold number of sessions. In some embodiments, the request is redirected at 208 to the next geographically closest CDN node to the requesting end user that has capacity to service the request. Any appropriate technique to redirect the request may be employed at 208. For example, the request may be redirected via a tunnel of the internal network of the CDN, the request may be redirected using an HTTP 302 redirect, etc.

Figure 3:
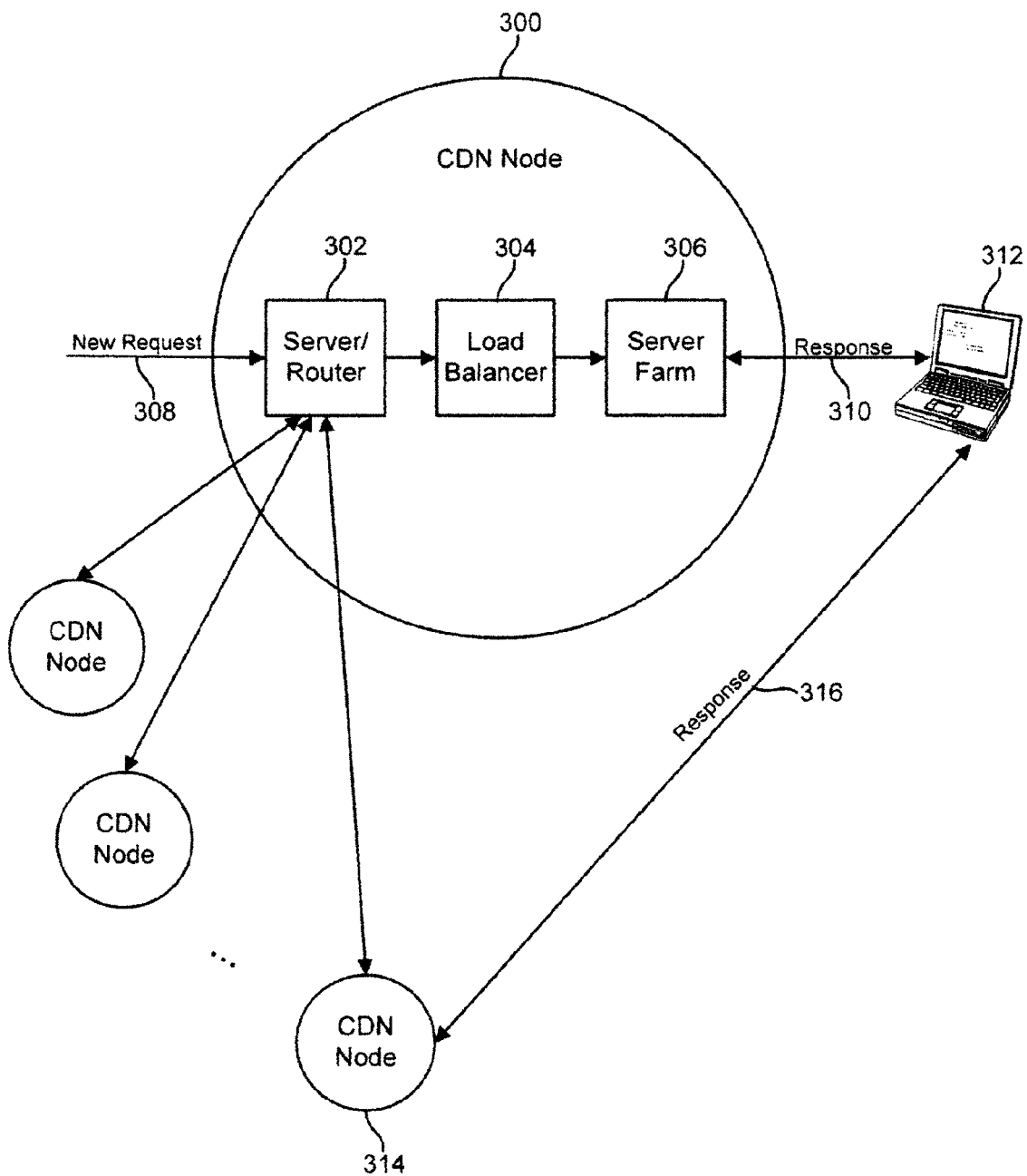
FIG. 3 is a block diagram illustrating an embodiment of a CDN node.

FIG. 3 is a block diagram illustrating an embodiment of a CDN node. For example, CDN node 300 may comprise CDN node 106(*a*) or CDN node 106(*b*) of FIG. 1. As depicted, CDN node 300 includes server/router 302, load balancer 304, and server farm 306. Server/router 302 monitors the number of sessions and/or requests currently being handled by CDN node 300. When a new request 308 is routed to CDN node 300, server/router 302 determines if CDN node 300 has the bandwidth or capacity to service a new request, e.g., based on the number of sessions currently being handled by CDN node 300. If CDN node 300 has the capacity to handle a new request (e.g., if the number of sessions currently being serviced by CDN node 300 is less than a prescribed threshold number), request 308 is transmitted from server/router 302 to load balancer 304. In some embodiments, load balancer 304 comprises a standard load balancer. Load balancer 304 transmits request 308 to an appropriate server in server farm 306 to service the request. The server in server farm 306 that services request 308 generates a response 310 which is transmitted to the end user 312 that issued request 308. However, if CDN node 300 does not have the capacity to handle a new request (e.g., because it is currently servicing a prescribed threshold number of sessions), request 308 is redirected by server/router 302 to another CDN node 314. In some embodiments, the redirection of request 308 is via a virtual tunnel to CDN node 314. CDN node 300 may include virtual tunnels to multiple other nodes of the CDN. A virtual tunnel may be implemented in any appropriate manner. For example, a tunneling protocol such as GRE (Generic Routing Encapsulation) or MPLS (Multi Protocol Label Switching) may be employed. In some embodiments, a virtual tunnel may comprise a direct backbone connection between CDN nodes. In some embodiments, the redirection of request 308 comprises an HTTP (Hypertext Transfer Protocol) 302 redirection to CDN node 314. The unicast address of CDN node 314 (rather than an associated anycast address which may also be shared by other CDN nodes including CDN node 300) is employed when redirecting request 308 to CDN node 314. As traffic builds up at CDN node 300, new requests can be redirected or routed by server/router 302 to one or more other CDN nodes based on the availabilities of the one or more other CDN nodes to service new requests. In some embodiments, a CDN node 314 from a set of available other CDN nodes that has the most efficient route to the end user 312 is selected by server/router 302. For example, the request may be redirected to a CDN node from a set of available other CDN nodes that is geographically closest to the end user who issued the request. CDN node 314 services request 308 and generates a response 316 to end user 312.

Figure 4:
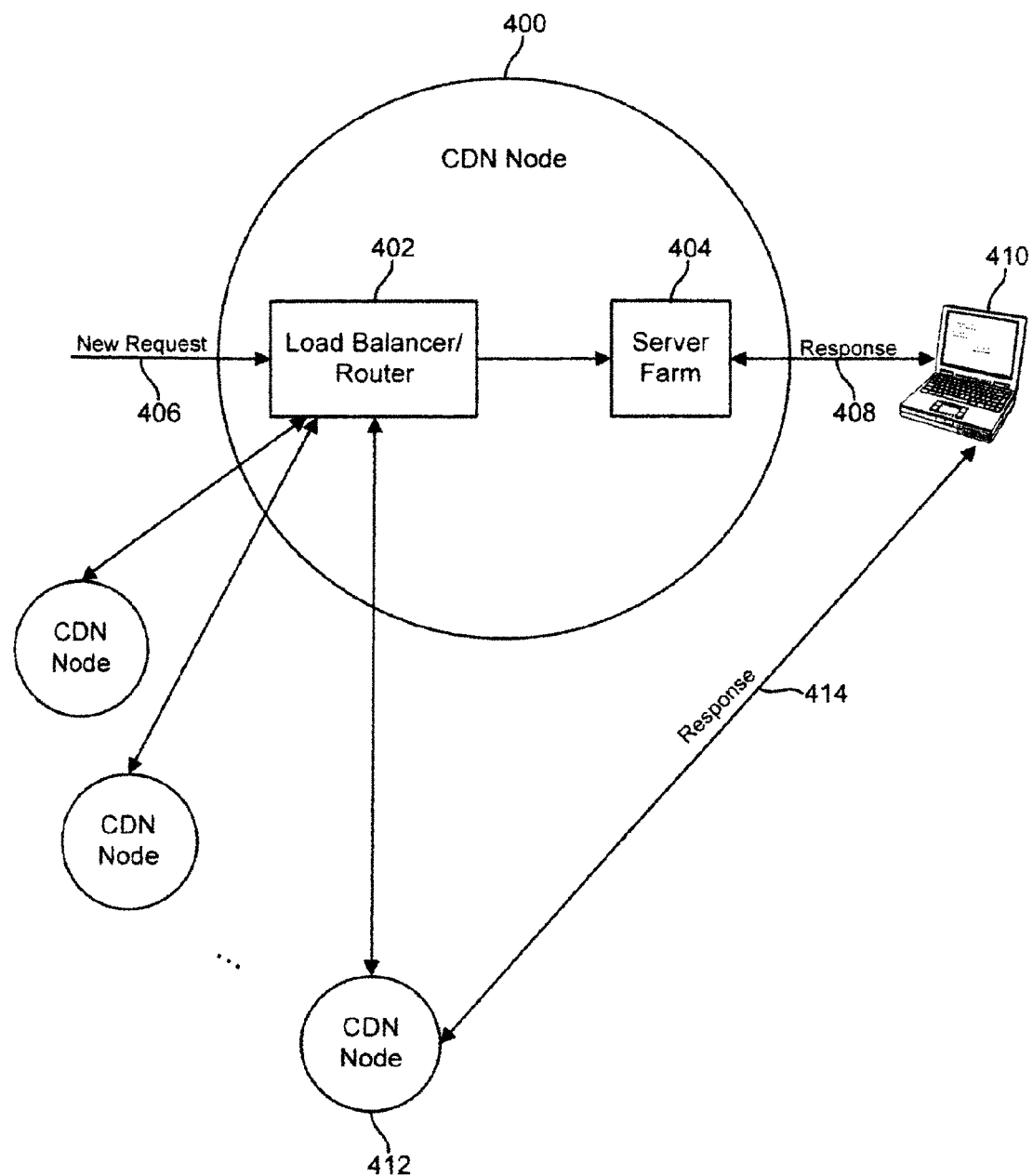
FIG. 4 is a block diagram illustrating an embodiment of a CDN node.

FIG. 4 is a block diagram illustrating another embodiment of a CDN node. For example, CDN node 400 may comprise CDN node 106(a) or CDN node 106(b) of FIG. 1. As depicted, CDN node 400 includes load balancer/router 402 and server farm 404. Load balancer/router 402 monitors the number of sessions and/or requests currently being handled by CDN node 400. In this example, load balancer/router 402 comprises a custom device. When a new request 406 is routed to CDN node 400, load balancer/router 402 determines if CDN node 400 has the bandwidth or capacity to service a new request, e.g., based on the number of sessions currently being handled by CDN node 400. If CDN node 400 has the capacity to handle a new request (e.g., if the number of sessions currently being serviced by CDN node 400 is less than a prescribed threshold number), request 406 is transmitted from load balancer/router 402 to an appropriate server in server farm 404 to service the request. The server in server farm 404 that services request 406 generates a response 408 that is transmitted to the end user 410 that issued request 406. However, if CDN node 400 does not have the capacity to handle a new request (e.g., because it is currently servicing a prescribed threshold number of sessions), request 406 is redirected by load balancer/router 402 to another CDN node 412. In some embodiments, the redirection of request 406 is via a virtual tunnel to CDN node 412. CDN node 400 may include virtual tunnels to multiple other nodes of the CDN. In some embodiments, the redirection of request 406 comprises an HTTP 302 redirect to CDN node 412. The unicast address of CDN node 412 (rather than an associated anycast address which may also be shared by other CDN nodes including CDN node 400) is employed when redirecting request 406 to CDN node 412. As traffic builds up at CDN node 400, new requests can be redirected or routed by load balancer/router 402 to one or more other CDN nodes based on the availabilities of the one or more other CDN nodes to service new requests. In some embodiments, a CDN node 412 from a set of available other CDN nodes that has the most efficient route to the end user 410 is selected by load balancer/router 402. For example, the request may be redirected to a CDN node from a set of available other CDN nodes that is geographically closest to the end user who issued the request. CDN node 412 services request 406 and generates a response 414 to end user 410.

For a CDN that is at least in part an anycast network and whose nodes are endpoints for serving content, the redirection techniques described herein allow traffic to be more evenly distributed within the CDN and prevent overload conditions at CDN nodes. To the external world, each of at least a subset of nodes of the CDN is accessible using a shared anycast IP address. However, internal communication between nodes of the CDN, e.g., during redirection, is feasible using a unicast IP address assigned to each node.

In addition to overflow management, the redirection techniques described herein may be employed for any other appropriate purposes. For example, redirection can be employed to put a CDN node into a maintenance or backup mode. In order to put a CDN node into such a mode, for instance, no new requests are accepted and are instead redirected to one, or more other CDN nodes; existing sessions are serviced until they finish; and once all or at least a subset of existing sessions have drained out, maintenance and/or backup operations are performed at the CDN node. Once the CDN node is ready to serve content again, it is announced on the network and starts accepting new sessions, with redirection to other CDN nodes taking place in the event of overload conditions as described.

In some embodiments, a CDN node or part thereof (e.g., server/router 302 of CDN node 300 or load balancer/router 402 of CDN node 400) monitors sessions in other CDN nodes and redirects incoming sessions that did not originate at the CDN node but are routed to the CDN node mid-session to the CDN nodes at which they originated. For example, consider that a CDN comprises a CDN node in Chicago and a CDN node in Dallas and that the Internet backbone over which the Dallas CDN node is servicing a session breaks. In such a case, the session would be routed mid-session by one or more associated ISP nodes to another CDN node, e.g., the CDN node in Chicago. The Chicago CDN node would recognize that the session was not established at the Chicago CDN node but instead at the Dallas CDN node and would redirect the session back to the Dallas CDN node. Thus, the redirection techniques described herein may be employed to ensure TCP stability by keeping the same session alive even though it has been routed to the wrong CDN node mid-session. Alternatively, in some embodiments, instead of redirecting the session back to the Dallas CDN node, the Chicago CDN node may break the session and establish a new session from the Chicago CDN node, e.g., by sending a TCP RST to the end user. This option may be desirable, for example, if the session was routed mid-session to the Chicago CDN node because the Dallas CDN node went down.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing traffic, comprising:
   receiving a request at a first node of a content delivery network;
   determining that the request should be serviced by a second node of the content delivery network; and
   redirecting the request to the second node;
   wherein the request is serviceable by any of a plurality of nodes including the first node and the second node that share a same anycast IP address to which the request is directed.

2. A method as recited in claim 1, wherein the request comprises a TCP anycast request.

3. A method as recited in claim 1, wherein the request is received at the first node from an Internet Service Provider node.

4. A method as recited in claim 1, further comprising monitoring sessions currently being serviced by the first node.

5. A method as recited in claim 1, further comprising monitoring sessions being serviced at other nodes of the content delivery network including the second node.

6. A method as recited in claim 1, wherein determining that the request should be serviced by the second node comprises determining that the first node is operating at capacity.

7. A method as recited in claim 1, wherein determining that the request should be serviced by the second node comprises determining that the first node is servicing a prescribed number of sessions.

8. A method as recited in claim 1, wherein determining that the request should be serviced by the second node comprises determining that the first node is in a maintenance or backup mode.

9. A method as recited in claim 1, wherein determining that the request should be serviced by the second node comprises determining that the request is a part of a session that originated at the second node.

10. A method as recited in claim 1, wherein determining that the request should be serviced by the second node comprises determining that the second node has capacity to service the request.

11. A method as recited in claim 1, wherein the second node is part of a set of available nodes of the content delivery network that have capacity to service the request and further comprising determining that in the set of available nodes the second node provides a most efficient route to an end user who issued the request.

12. A method as recited in claim 1, wherein the request is redirected to the second node via a virtual tunnel.

13. A method as recited in claim 1, wherein the request is redirected to the second node via an HTTP 302 redirect.

14. A method as recited in claim 1, wherein the request is redirected to the second node using a unicast IP address associated with the second node.

15. A method as recited in claim 1, further comprising servicing the request at the second node.

16. A system for managing traffic, comprising:
    a processor at a first node of a content delivery network configured to:
        receive a request;
        determine that the request should be serviced by a second node of the content delivery network; and
        redirect the request to the second node; and
    a communication interface coupled to the processor and configured to receive the request;
    wherein the request is serviceable by any of a plurality of nodes including the first node and the second node that share a same anycast IP address to which the request is directed.

17. A system as recited in claim 16, wherein the request is received at the first node from an Internet Service Provider node.

18. A computer program product for managing traffic, the computer program product being embodied in a non-transitory computer readable storage medium and comprising computer instructions for:
    receiving a request at a first node of a content delivery network;
    determining that the request should be serviced by a second node of the content delivery network; and
    redirecting the request to the second node;
    wherein the request is serviceable by any of a plurality of nodes including the first node and the second node that share a same anycast IP address to which the request is directed.

19. A system as recited in claim 16, wherein the request comprises a TCP anycast request.

20. A system as recited in claim 16, wherein the processor is further configured to monitor sessions currently being serviced by the first node.

21. A system as recited in claim 16, wherein the processor is further configured to monitor sessions being serviced at other nodes of the content delivery network including the second node.

22. A system as recited in claim 16, wherein to determine that the request should be serviced by the second node comprises to determine that the first node is operating at capacity.

23. A system as recited in claim 16, wherein to determine that the request should be serviced by the second node comprises to determine that the first node is servicing a prescribed number of sessions.

24. A system as recited in claim 16, wherein to determine that the request should be serviced by the second node comprises to determine that the first node is in a maintenance or backup mode.

25. A system as recited in claim 16, wherein to determine that the request should be serviced by the second node comprises to determine that the request is a part of a session that originated at the second node.

26. A system as recited in claim 16, wherein to determine that the request should be serviced by the second node comprises to determine that the second node has capacity to service the request.

27. A system as recited in claim 16, wherein the second node is part of a set of available nodes of the content delivery network that have capacity to service the request and wherein the processor is further configured to determine that in the set of available nodes the second node provides a most efficient route to an end user who issued the request.

28. A system as recited in claim 16, wherein the request is redirected to the second node via a virtual tunnel.

29. A system as recited in claim 16, wherein the request is redirected to the second node via an HTTP 302 redirect.

30. A system as recited in claim 16, wherein the request is redirected to the second node using a unicast IP address associated with the second node.

31. A computer program product as recited in claim 18, wherein the request comprises a TCP anycast request.

32. A computer program product as recited in claim 18, wherein the request is received at the first node from an Internet Service Provider node.

33. A computer program product as recited in claim 18, further comprising computer instructions for monitoring sessions currently being serviced by the first node.

34. A computer program product as recited in claim 18, further comprising computer instructions for monitoring sessions being serviced at other nodes of the content delivery network including the second node.

35. A computer program product as recited in claim 18, wherein determining that the request should be serviced by the second node comprises determining that the first node is operating at capacity.

36. A computer program product as recited in claim 18, wherein determining that the request should be serviced by the second node comprises determining that the first node is servicing a prescribed number of sessions.

37. A computer program product as recited in claim 18, wherein determining that the request should be serviced by the second node comprises determining that the first node is in a maintenance or backup mode.

38. A computer program product as recited in claim 18, wherein determining that the request should be serviced by the second node comprises determining that the request is a part of a session that originated at the second node.

39. A computer program product as recited in claim 18, wherein determining that the request should be serviced by the second node comprises determining that the second node has capacity to service the request.

40. A computer program product as recited in claim 18, wherein the second node is part of a set of available nodes of the content delivery network that have capacity to service the request and further comprising computer instructions for determining that in the set of available nodes the second node provides a most efficient route to an end user who issued the request.

41. A computer program product as recited in claim 18, wherein the request is redirected to the second node via a virtual tunnel.

42. A computer program product as recited in claim 18, wherein the request is redirected to the second node via an HTTP 302 redirect.

43. A computer program product as recited in claim 18, wherein the request is redirected to the second node using a unicast IP address associated with the second node.

* * * * *